United States Patent
Lyu

[11] Patent Number: 5,839,749
[45] Date of Patent: Nov. 24, 1998

[54] CASTER ANGLE CONTROL SYSTEM FOR VEHICLES

[75] Inventor: Dong Jo Lyu, Jungsan-ri, Rep. of Korea

[73] Assignee: Hyundai Motor Company, Seoul, Rep. of Korea

[21] Appl. No.: 684,823

[22] Filed: Jul. 22, 1996

[30] Foreign Application Priority Data

Jul. 21, 1995 [KR] Rep. of Korea .................. 1995-21581

[51] Int. Cl.⁶ .................................................. B62D 17/00
[52] U.S. Cl. .......................................................... 280/661
[58] Field of Search ............................................ 280/661

[56] References Cited

U.S. PATENT DOCUMENTS

| | | | |
|---|---|---|---|
| 4,835,714 | 5/1989 | Sano et al. | 280/661 |
| 4,971,438 | 11/1990 | Oyama et al. | 280/661 |
| 5,143,400 | 9/1992 | Miller et al. | 280/661 |
| 5,438,515 | 8/1995 | Miichi et al. | 280/661 |
| 5,472,225 | 12/1995 | Harara et al. | 280/661 |
| 5,481,458 | 1/1996 | Harara et al. | 280/661 |

FOREIGN PATENT DOCUMENTS 5213029  8/1993  Japan .

*Primary Examiner*—Kenneth R. Rice

[57] ABSTRACT

A caster angle control system for vehicles includes a vehicle speed sensor (VSS) for sensing the current vehicle speed; an electronic control unit (ECU), which receives signals from the VSS to determine the current vehicle speed; a strut assembly having a lower end fixed pivotally on a knuckle arm and an upper end fixed to a vehicle body, the strut assembly being arranged to define a caster angle; and a caster control device for controlling the caster angle through allowing the strut assembly to pivot forward and backward in a longitudinal direction of the vehicle centering the lower end of the strut assembly by control of the ECU, which receives the signals from the VSS to determine the current vehicle speed. The caster angle control system for vehicles provides the caster angle control device including an actuator, which is operated in response to the control of the ECU and allows a cam to rotate thereby; a cam, which is rotated by the operation of the actuator; and a reciprocating movement member, which is moved forward and backward by the rotation movement of the cam, allowing the upper end of the strut assembly to be moved forward and backward in a longitudinal direction of the vehicle centering on the lower end of the strut assembly.

8 Claims, 3 Drawing Sheets

CASTER ANGLE CONTROL SYSTEM FOR VEHICLES

BACKGROUND

The present invention relates to a caster angle control system for vehicles, and more particularly, to a caster angle control system for vehicles which can improve handling and straight driving ability by changing a caster angle according to vehicle speed.

Steerable wheels together with a steerable knuckle can be steered toward the left and right direction centering around a kingpin or a ball joint.

In order to improve maneuverability of the vehicle, the steerable wheels are disposed at fixed angles with relative to the vehicle in order to allow stable driving of the vehicle.

Camber, a kingpin inclination, toe, and caster are alignment elements which are required in order to optimize the driving state of the vehicle.

Among the above alignment elements, caster provides a restoring force for the steerable wheels when the steerable wheels are steered. A caster angle is defined by an angle, in side elevation, between the steering axis and the vertical.

However, if the caster angle is not adequate, it exerts a harmful influence upon maneuverability because handling becomes heavy and a shimmy phenomenon occurs.

Handling generally becomes light when the vehicle is travelling at high speeds. However, it should actually become light when the vehicle is travelling at low speeds and become heavy when travelling at high speeds. Therefore, there is a need for a system which can control the caster angle in response to vehicle.

In addition, the caster angle control system is proposed in the Japanese laid-open publication No. P5-213029.

SUMMARY

The present invention is directed to a caster control system that satisfies this need.

To achieve the need, the present invention provides the caster angle control system for vehicles, including a vehicle speed sensor (VSS) for sensing the current vehicle speed; an electronic control unit (ECU), which receives signals from a vehicle speed sensor (VSS) to determine a current vehicle speed; a strut assembly having a lower end mounted pivotally on a knuckle arm and an upper end fixed to a vehicle body, the strut assembly being arranged to define a caster angle; and a caster control device for controlling the caster angle by allowing the strut assembly to pivot forward and backward in a longitudinal direction of the vehicle about the lower end of the strut assembly under control of the ECU, which receives the signals from the VSS to determine the current vehicle speed.

The caster angle control system for vehicles provides the caster angle control device including an actuator, which is operated in response the control of the ECU; a cam, which rotates according to the operation of the actuator; and a reciprocating movement member, which moves forward and backward by the rotation movement of the cam, thereby allowing the upper end of the strut assembly to be moved forward and backward in a longitudinal direction of the vehicle about the lower end of the strut assembly.

Also, the caster angle control system for vehicles provides the strut assembly including a plurality of damping mechanisms for preventing an abrupt caster angle change when controlling the caster.

Also, the caster angle control system for vehicles provides damping mechanisms having an absorber, which works towards the front and rear in a reciprocal fashion centering on a rod disposed in an insulator.

Furthermore, the caster angle control system for vehicles provides a plurality of damping mechanisms, which are connected together with the strut assembly and one insulator.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DESCRIPTION

A preferred embodiment of the present invention will now be described in detail with reference to the accompanying drawings.

Figure 1:
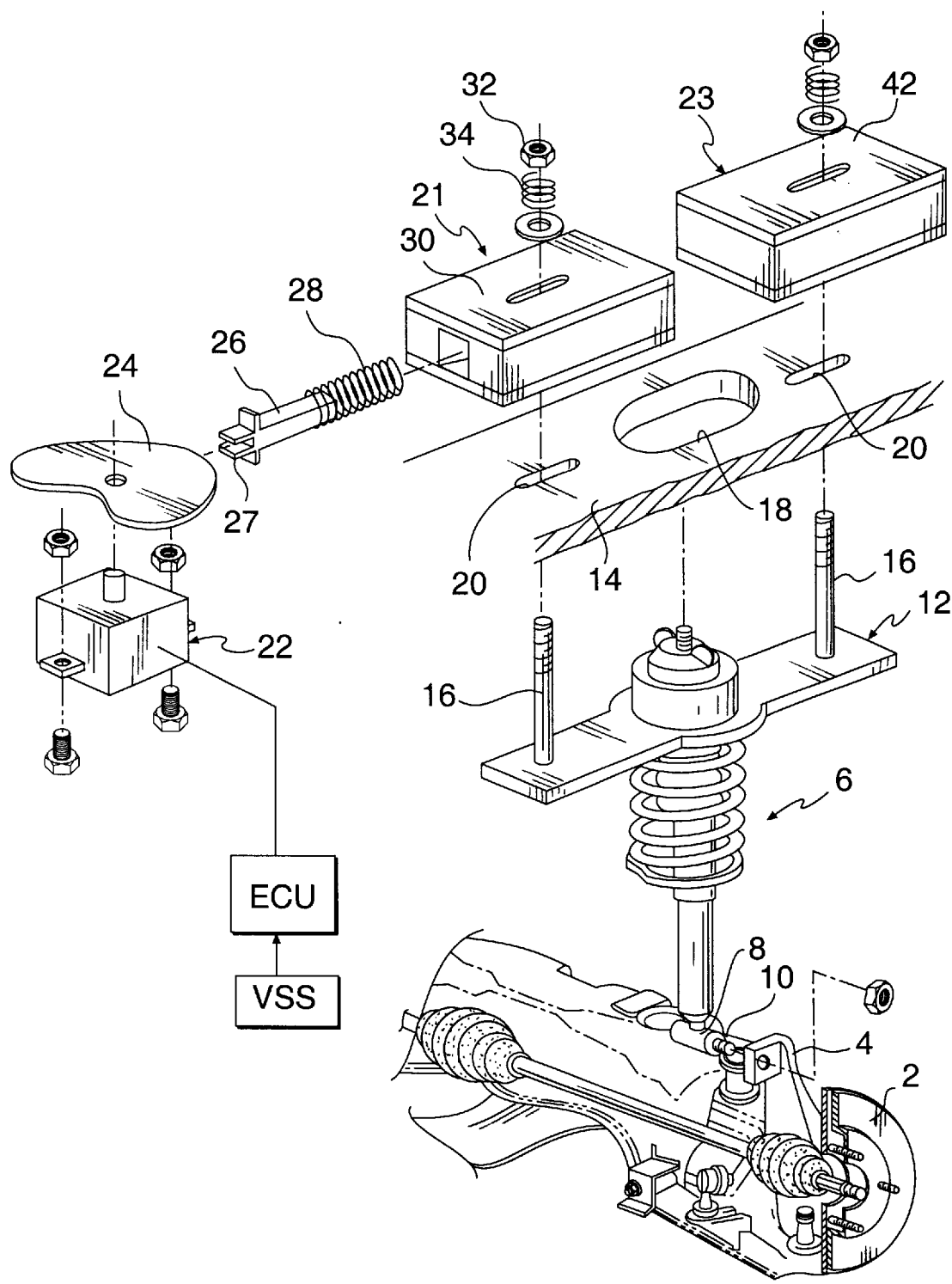
FIG. 1 is an exploded perspective view illustrating a caster angle control system for vehicles in accordance with a preferred embodiment of the present invention.

Referring to FIG. 1, a lower end portion of a strut assembly 6 is rotatably combined via a bearing 8 with a knuckle arm 4, which is combined with a hub 2.

The strut assembly 6 has a rotatable structure because a pin 10 is substantially fixed in the bearing 8 and the pin 10 is fixed to the knuckle arm 4.

An insulator 12 is provided on the upper end of the strut assembly 6 opposite knuckle arm 4 so that it can absorb vibrations transmitted toward a wheel housing panel 14.

The insulator 12 is made of a substantially rectangular plate, contacting the housing panel 14 and being mounted there to by bolts 16.

Elongated slots 18, 20 are provided in the wheel housing panel 14 so as to allow the upper portion of the strut assembly 6 to slightly rock in a longitudinal direction of the vehicle body.

The upper portion of the strut assembly 6 is passed through one elongated slot 18 and the bolts 16 are passed through the other elongated slots 20.

The bolts mentioned here can be any member that allows the upper portion of the strut assembly 6 to slightly rock forward and backward.

The bolts 16 pass through the wheel housing panel and extend there beyond. The bolts 16 have a relatively long length in order to transmit caster control power from damping mechanisms 21, 23 of the caster control device, which are disposed on the upper side of the wheel housing panel 14, to the strut assembly 6.

One of the damping mechanisms 21 includes a reciprocating movement member 26, which more linearly moves along an outer side curvature of a cam 24. The cam 24 is rotated by an actuator 22. An elastic member 28 ensures that the reciprocating movement member 26 is always in close contact with the outer side of the cam 24, thereby allowing it to move linearly.

A slit 27 is formed on the contact part of the reciprocating movement member 26 which contacts the cam 24 so as to ensure proper alignment between the reciprocating movement member 26 and the cam 24.

The reciprocating movement member 26 and the elastic member 28 are disposed within a case 30, which is welded on the wheel housing panel 14, allowing the driving power of the actuator 22 to be transmited to the strut assembly 6 by contacting the bolt 16 inside the case 30.

The bolt 16 passes through the case 30 and is fixed by a nut member 32. A small elastic member 34 is elastically disposed between the nut member 32 and the case 30 so that it can absorb displacement of the strut assembly 6.

Figure 2A:
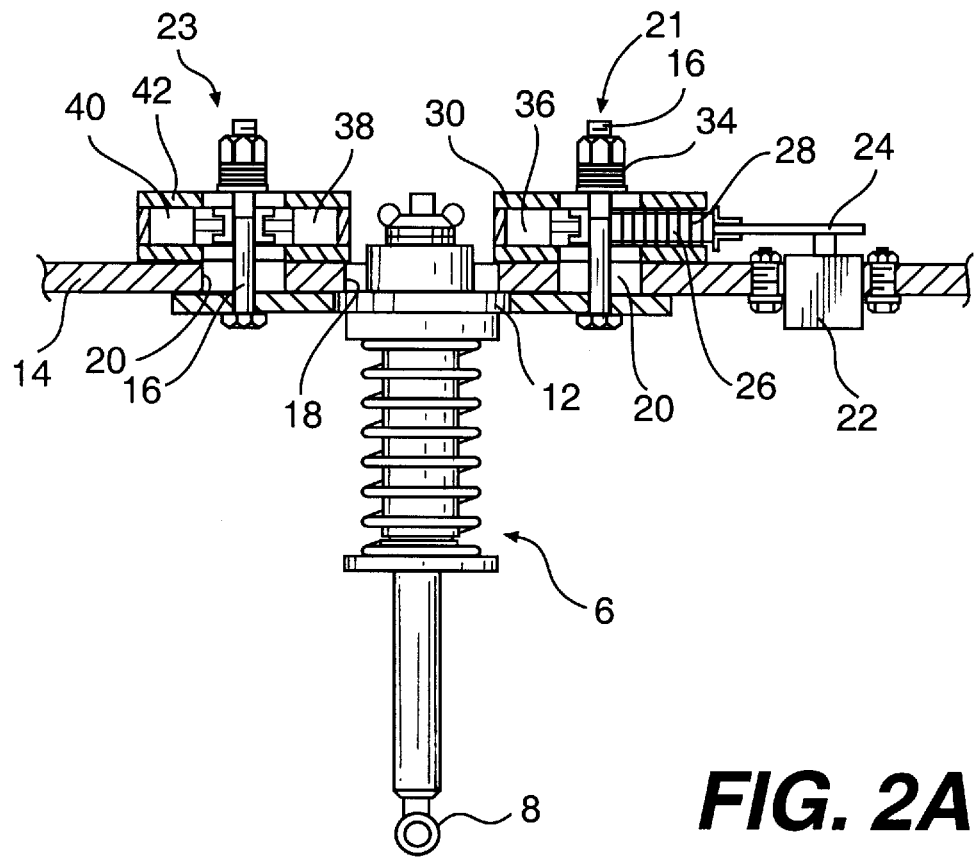
FIG. 2A is a side-sectional view illustrating a combination of a caster angle control system for vehicles in accordance with a preferred embodiment of the present invention when a vehicle is travelling at low speeds.
Figure 2B:
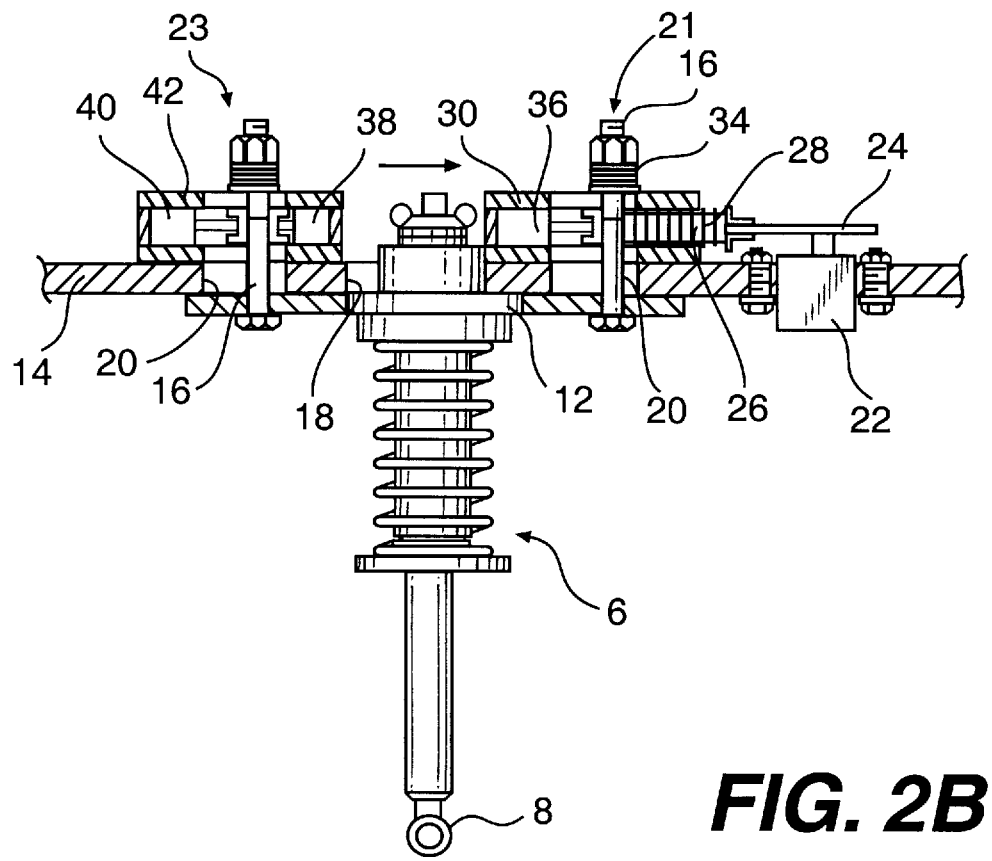
FIG. 2B is a side-sectional view illustrating a combination of a caster angle control system for vehicles in accordance with a preferred embodiment of the present invention when a vehicle is travelling at relatively high speeds.

As illustrated in FIGS. 2A and 2B, an absorber 36 is disposed inside the case 30 so that it allows the bolt 16 to be slowly inclined as the bolt 16 is inclined by the actuator 22.

The other damping mechanism 23 is mounted in a position facing the damping mechanism 21 on the wheel housing panel 14 so that it can safely control the caster by providing reacting force when the strut assembly 6 is inclined.

This damping mechanism 23 comprises absorbers 38 and 40 which are respectively arranged on opposite sides of the bolt 16 in the case 42.

The actuator 22 is electrically connected to the output terminal of an electronic control unit (ECU) so as to rotate the cam 24 in accordance with signals from the ECU (see FIG. 1).

The ECU receives signals from a vehicle speed sensor (VSS) and uses this information to control the actuator 22.

Figure 3A:
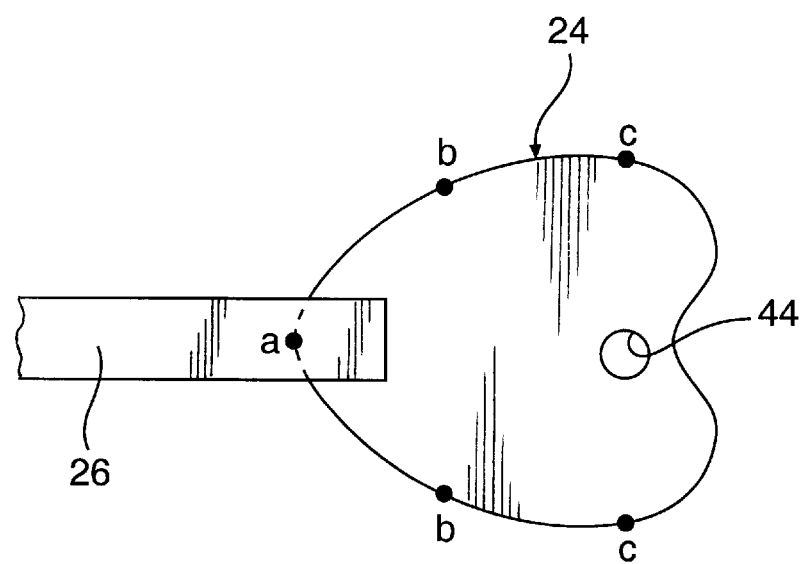
FIG. 3A is a view illustrating a position of a cam in accordance with a preferred embodiment of the present invention when a vehicle is travelling at low speeds.

Referring to FIG. 3A, a hole 44, in which a driving shaft of the actuator 22 is inserted, is drilled in the cam 24. The amount of caster change is controlled in accordance with the variation of the distance from the hole 44 to the outer circumference points a, b and c of the cam 24.

In the caster angle control system as described above, the caster angle is controlled as the cam 24 rotates, thereby linearly moving the reciprocating movement member 26.

Namely, the outer circumference of cam 24 is designed such that point a is a point where the caster angle is maintained at 0 or positive caster, and moving to point b, and onto point c, the caster angle increases.

In the preferred embodiment of the present invention, the curve from point a to point b in the cam 24 is designated as the low-speed section, and the curve from point b to point c in the cam 24 is designated as the medium to high-speed section.

If signals are transferred from the VSS to the ECU, the ECU determines the caster angle and commands the actuator 22 to operate.

At this time, when increasing the caster angle, namely, travelling at high speeds, the ECU allows the operation time of the actuator 22 to increase so as to rotate the cam 24 until the slit 27 of the reciprocating movement member 26 corresponds to point c of the cam 24.

Figure 3B:
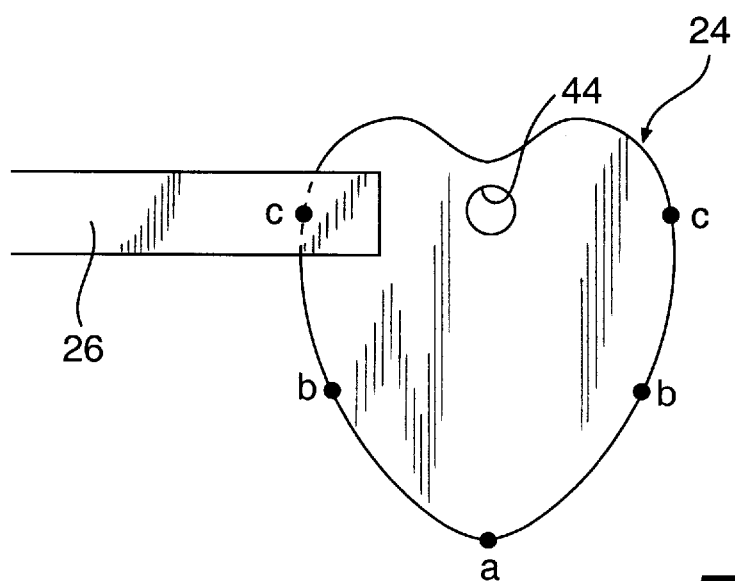
FIG. 3B is a view illustrating a position of a cam in accordance with a preferred embodiment of the present invention when a vehicle is travelling at relatively high speeds.

If the cam 24 is rotated by the operation of the actuator 22 from the state shown in FIG. 3A, then the result is the changing of the state of the cam 24 as shown in FIG. 3B. The reciprocating movement member 26 is moved to the right by the cam 24 as it pushes against the elastic force of the elastic member 28 as in FIG. 2A.

The absorber 36 that is placed on the opposite side of the reciprocating movement member 26 centering on the bolt 16 is extended by the above operation and the operation allows the bolt 16 to press toward the right side. Therefore, the insulator 12 that is connected to the lower portion of the bolt 16 is moved to the right as shown in FIG. 2A.

If the insulator is moved like the above, the strut assembly 6, which is to joined with the insulator 12 at its upper portion, is inclined to the right centering on the bearing 8 of the lower portion.

Namely, as illustrated in FIG. 2B, the strut assembly 6 is inclined, maintaining a positive caster angle. At this time, because the absorber 38 of the damping mechanism 21 is pressed, the caster of the strut assembly 6 is changed in a stable fashion thereby.

If the vehicle speed decreases while the caster angle is increased as described above, the ECU allows the cam 24 to rotate in a direction opposite that of the above.

This control allows the cam 24 to push the reciprocating movement member 26 to the left direction as in FIG. 2A, and next, it allows the reciprocating movement member 26 to push the bolt 16.

Accordingly, the caster angle of the strut assembly 6 having a positive caster is gradually decreased by the above operation.

In addition, the absorber 36 prevents an abrupt operation by its damping function.

As described in the above, the caster angle control system for vehicles serves to improve the maneuverability of the vehicle by making the handling light when the vehicle is at low speeds and heavy when the vehicle is at high speeds.

While this invention has been described in connection with what is presently considered to be the most practical and preferred embodiments, it is to be understood that the invention is not limited to the disclosed embodiment, but, on the contrary, it is intended to cover various modifications and equivalent arrangements included within the spirit and scope of the appended claims.

What is claimed is:

1. A caster angle control system for a vehicle, comprising:
    a vehicle speed sensor (VSS) constructed and arranged to sense a speed of the vehicle and generate a speed signal corresponding thereto;
    an electronic control unit (ECU) constructed and arranged to generate a control signal in accordance with said speed signal generated by said VSS;
    a strut assembly having a first end pivotally mounted on a knuckle arm and a second end connected to a portion of the vehicle, said strut assembly being arranged to define a caster angle; and
    a caster control device constructed and arranged to control said caster angle by causing said strut assembly to pivot about said first end of said strut assembly in accordance with said control signal generated by said ECU, wherein said caster control device comprises:
    an actuator connected to said ECU and operated according to said control signal;
    a cam constructed and arranged to be rotatably driven by said actuator; and a reciprocating movement member constructed and arranged to be reciprocally driven by rotation of said cam, said reciprocating movement member driving said pivotal movement of said strut assembly about said second end of said strut assembly.

2. The caster angle control system of claim 1, wherein said caster control device causes said strut assembly to pivot along a longitudinal direction of the vehicle.

3. The caster angle control system of claim 1, wherein said caster control device further comprises a plurality of damping mechanisms constructed and arranged to prevent an abrupt change in said caster angle.

4. The caster angle control system of claim 3, wherein said plurality of damping mechanisms have an absorber, which works in a reciprocal fashion centering on a rod disposed in an insulator.

5. The caster angle control system of claim 3, wherein said plurality of damping mechanisms are connected together with said strut assembly and said insulator.

6. The caster angle control system of claim 4, wherein said absorber works along a longitudinal direction of the vehicle.

7. The caster angle control system of claim 1, wherein said strut assembly passes through a portion of a wheel housing of the vehicle, a front and a rear position of the wheel housing.

8. The caster angle control system of claim 1, wherein said reciprocating movement member is elastically maintained in contact with said cam by an elastic member.

* * * * *